(12) United States Patent
Peterlechner

(10) Patent No.: US 10,234,277 B2
(45) Date of Patent: Mar. 19, 2019

(54) LENGTH-MEASURING DEVICE

(71) Applicant: DR. JOHANNES HEIDENHAIN GmbH, Traunreut (DE)

(72) Inventor: Andreas Peterlechner, St. Radegund (AT)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 172 days.

(21) Appl. No.: 15/478,250

(22) Filed: Apr. 4, 2017

(65) Prior Publication Data
US 2017/0284793 A1    Oct. 5, 2017

(30) Foreign Application Priority Data

Apr. 5, 2016  (EP) .................................. 16163847

(51) Int. Cl.
| | | |
|---|---|---|
| G01B 11/04 | (2006.01) | |
| G01D 5/347 | (2006.01) | |
| G01B 11/14 | (2006.01) | |

(52) U.S. Cl.
CPC .............. *G01B 11/14* (2013.01); *G01B 11/04* (2013.01); *G01D 5/34746* (2013.01); *G01D 5/34753* (2013.01)

(58) Field of Classification Search
CPC .......... G01B 11/14; G01B 7/14; G01B 21/16; G01B 11/04; G01B 11/02; G01D 5/347; G01D 5/34746; G01D 5/34753
USPC .......................................... 33/706, 707, 708
See application file for complete search history.

(56) References Cited

U.S. PATENT DOCUMENTS

| | | | | | |
|---|---|---|---|---|---|
| 4,120,093 | A | * | 10/1978 | Spies .................... | G01B 5/0009 33/533 |
| 4,160,328 | A | * | 7/1979 | Ernst ..................... | G01D 5/347 33/705 |
| 4,169,316 | A | * | 10/1979 | Ernst .................. | G01D 5/34753 33/707 |
| 4,170,826 | A | * | 10/1979 | Holstein ............ | G01D 5/34761 33/702 |

(Continued)

FOREIGN PATENT DOCUMENTS

| | | |
|---|---|---|
| DE | 3327266 A1 | 2/1984 |
| DE | 102007044128 A1 | 3/2009 |
| EP | 0382706 A2 | 8/1990 |

*Primary Examiner* — Christopher W Fulton
(74) *Attorney, Agent, or Firm* — Leydig, Voit & Mayer, Ltd.

(57) ABSTRACT

A length-measuring device includes a scanning carriage for scanning a measuring graduation that is to be guided longitudinally in the measurement direction on a guide surface. A coupling couples the scanning carriage to a drive dog rigidly in the measurement direction and resiliently transversely to the measurement direction. A first spring is disposed between a connecting element of the coupling and the drive dog and exerts a pressure force on the scanning carriage at a first position so as to press the scanning carriage against the guide surface. A second spring is disposed between the connecting element and the scanning carriage. The second spring is spaced apart from the first spring in the measurement direction and exerts a pressure force on the scanning carriage at a second position spaced apart from the first position in the measurement direction so as to press the scanning carriage against the guide surface.

11 Claims, 3 Drawing Sheets

(56) References Cited

U.S. PATENT DOCUMENTS

| | | | | |
|---|---|---|---|---|
| 4,184,262 A * | 1/1980 | Kolb | ................ | B23Q 17/22 |
| | | | | 33/707 |
| 4,262,423 A * | 4/1981 | Affa | ................ | G01D 5/34753 |
| | | | | 33/702 |
| 4,295,742 A * | 10/1981 | Nelle | ................ | G01D 5/34753 |
| | | | | 33/707 |
| 4,475,289 A * | 10/1984 | Nelle | ................ | G01B 7/02 |
| | | | | 250/237 G |
| 4,512,082 A * | 4/1985 | Burkhardt | ................ | G01D 5/24452 |
| | | | | 33/706 |
| 4,527,056 A * | 7/1985 | Burkhardt | ................ | G01B 5/0011 |
| | | | | 250/237 G |
| 4,549,353 A | 10/1985 | Souji | | |
| 4,564,294 A * | 1/1986 | Ernst | ................ | G01B 3/002 |
| | | | | 250/237 G |
| 4,974,332 A * | 12/1990 | Luttmer | ................ | G01D 18/00 |
| | | | | 33/706 |
| 4,982,507 A | 1/1991 | Rieder et al. | | |
| 7,856,734 B2 | 12/2010 | Affa | | |
| 2002/0029488 A1* | 3/2002 | Nishi | ................ | G01D 5/34753 |
| | | | | 33/706 |

\* cited by examiner

LENGTH-MEASURING DEVICE

CROSS-REFERENCE TO PRIOR APPLICATION

Priority is claimed to European Patent Application No. EP 16163847.3, filed on Apr. 5, 2016, the entire disclosure of which is hereby incorporated by reference herein.

FIELD

The present invention relates to a length-measuring device having a carrier with a scale with a measuring graduation, and a scanning carriage coupled to a drive dog.

BACKGROUND

Length-measuring devices are used for measuring lengths and distances and are used, in particular, in machine tools for measuring the movement of a tool relative to a workpiece to be machined, in coordinate measuring machines, and increasingly also in the semiconductor industry.

German Patent Application No. DE 33 27 266 A1 discloses a length-measuring device. A flexurally stiff connecting element is used to couple the scanning carriage to the drive dog. This flexurally stiff connecting element is coupled to the scanning carriage at a single position. In order to keep the scanning carriage balanced, this position is located at the center of the scanning carriage.

SUMMARY

In an embodiment, the present invention provides a length-measuring device including a carrier extending longitudinally in a measurement direction. A scale having a measuring graduation is disposed on the carrier. A scanning carriage is configured to scan the measuring graduation, being guided longitudinally in the measurement direction on at least one guide surface. A coupling couples the scanning carriage to a drive dog rigidly in the measurement direction and resiliently transversely to the measurement direction. The coupling includes a connecting element which extends in the measurement direction and is rotatably mounted to the scanning carriage at a first pivot joint and to the drive dog at a second pivot joint spaced apart from the first pivot joint in the measurement direction. A first spring is disposed between the connecting element and the drive dog and exerts a pressure force on the scanning carriage at a first position so as to press the scanning carriage against the at least one guide surface. A second spring is disposed between the connecting element and the scanning carriage. The second spring is spaced apart from the first spring in the measurement direction and exerts a pressure force on the scanning carriage at a second position spaced apart from the first position in the measurement direction so as to press the scanning carriage against the at least one guide surface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
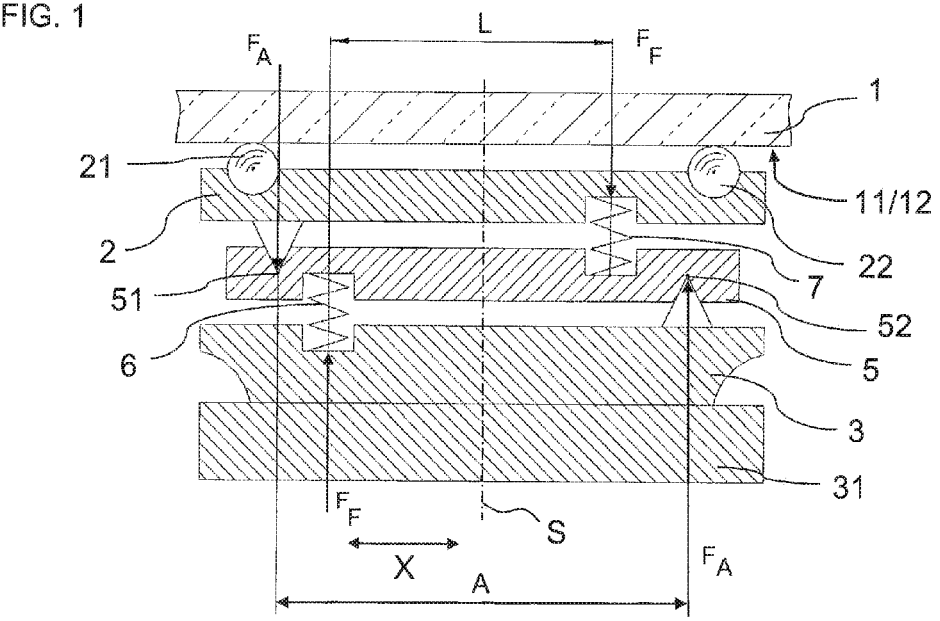
FIG. 1 is a schematic representation of a length-measuring device according to an embodiment of the present invention.
Figure 2:
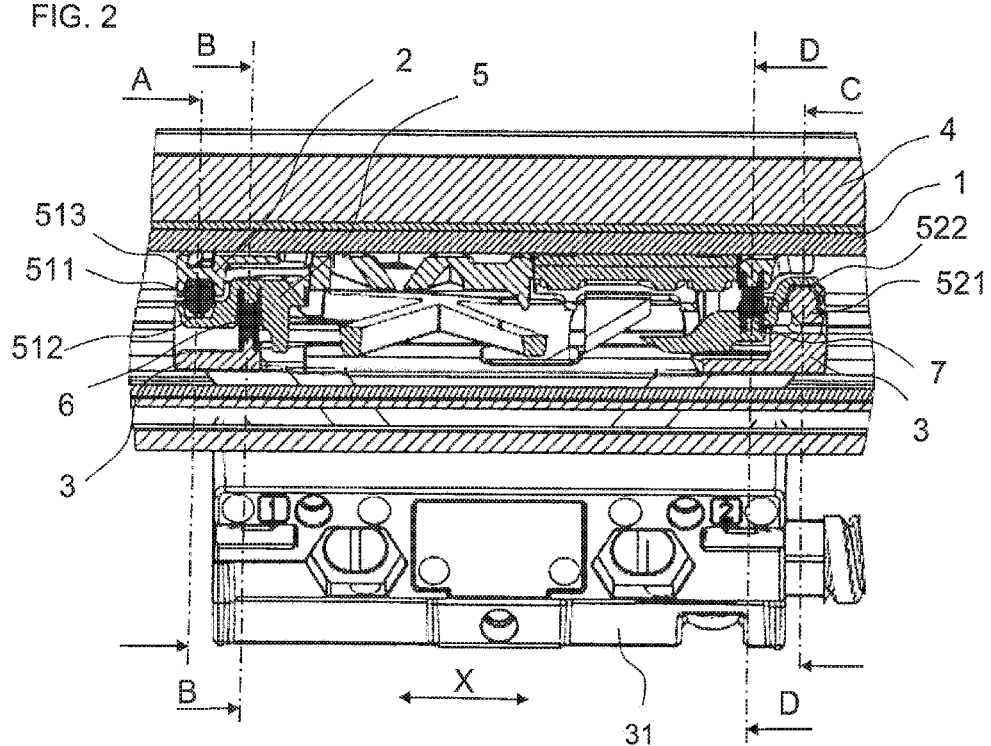
FIG. 2 is a cross-sectional view of a specific embodiment of a length-measuring device according to the present invention.
Figure 3:
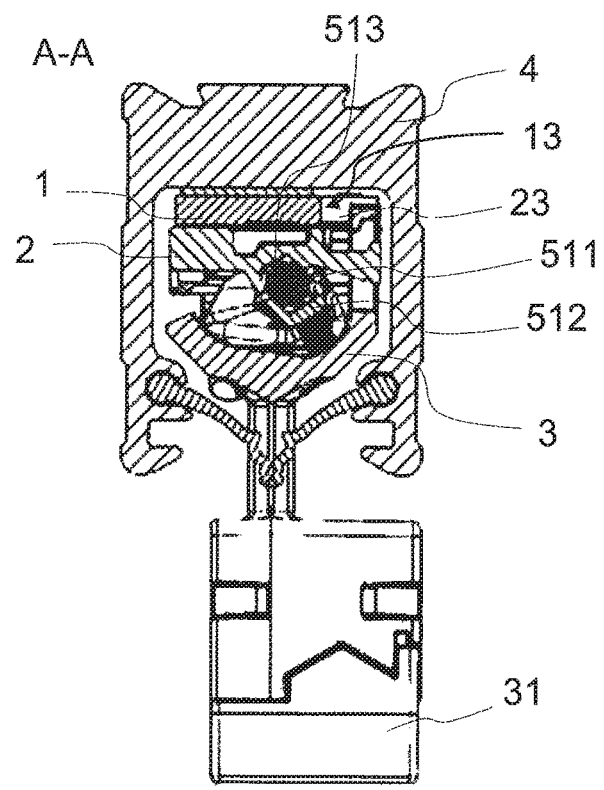
FIG. 3 is a cross-sectional view of the length-measuring device, taken along line A-A in FIG. 2.

In an embodiment, the present invention provides a length-measuring device that is compact in design and permits accurate position measurement.

According to an embodiment, the length-measuring device includes: a carrier extending longitudinally in the measurement direction and having a scale provided thereon;
a scanning carriage for scanning a measuring graduation of the scale, the scanning carriage being guided longitudinally in the measurement direction on at least one guide surface;
a coupling which couples the scanning carriage to a drive dog rigidly in the measurement direction and resiliently transversely thereto, the coupling including a connecting element which extends in the measurement direction and is rotatably mounted to the scanning carriage at a first pivot joint and to the drive dog at a second pivot joint spaced apart from the first pivot joint in the measurement direction, and the scanning carriage being pressed against the at least one guide surface,
a first spring means being provided between the connecting element and the drive dog, the first spring means exerting a pressure force on the scanning carriage, pressing it against the at least one guide surface, and
a second spring means being provided between the connecting element and the scanning carriage, the second spring means exerting a pressure force on the scanning carriage, pressing it against the at least one guide surface, the first spring means being spaced apart from the second spring means in the measurement direction.

The first spring means exerts a pressure force on the scanning carriage at a first position, and the second exerts a pressure force on the scanning carriage at a position spaced apart from the first position in the measurement direction. The first position and the second position are to be understood as points of application of the forces introduced by the spring means into the scanning carriage.

The length-measuring device according to an embodiment of the present invention permits precise position measurement since the scanning carriage is held in a vibration-resistant manner. Since the introduction of force into the scanning carriage occurs at a plurality of positions spaced apart from each other in the measurement direction, the bending stresses in the connecting element and the scanning carriage are minimized. This permits a more fragile and thus more weight-saving design (reduced mass) for the connecting element, thereby increasing resistance to vibration and contributing to improved measurement accuracy.

The connecting element should be made as rigid as possible against tensile and compressive stresses.

A space-saving design is ensured since the entire length of the scanning carriage can be used for the coupling elements. The connecting element may be accommodated in a space-saving manner over the entire length of the scanning carriage, and thus may be relatively long in the measurement direction. This relatively long connecting element, which is mounted in an articulated manner on both sides, particularly effectively compensates for assembly tolerances and changes in distance occurring during operation between the scale and the drive dog transversely to the measurement direction due to alignment deviations. The measurement errors occurring in the measurement direction are all the smaller, the longer the connecting element is.

The pivot joints are spaced apart from each other in the measurement direction. The first pivot joint is disposed at, or at least near, the position of the first spring means (viewed in the measurement direction), and the second pivot joint is disposed at, or at least near, the position of the second spring means (viewed in the measurement direction).

The pivot joints are in particular adapted to compensate for the following degrees of freedom between the scanning carriage and the drive dog: distance, transverse displacement, yaw angle, pitch angle, roll angle.

The scanning carriage may be coupled to the drive dog resiliently transversely to the measurement direction in these degrees of freedom by means of pivot joints which are configured as an arrangement of flexure bearings or as ball-and-socket joints.

It is particularly advantageous if the two pivot joints are configured as ball-and-socket joints. In this case, the two spring means have the additional function of urging the respective ball into a mating receiving seat, thus urging the ball and the receiving seat against one another and thereby creating an articulated connection which is free of play in the measurement direction.

The present invention will be described using the example of an optical length-measuring device used to measure the relative position of two objects that are movable relative to one another in measurement direction X. For purposes of position measurement, a scale 1 of the length-measuring device is attached to one of these objects, and a scanning carriage 2 of the length-measuring device is attached to the other of these objects. Scale 1 is scanned by scanning carriage 2, which is movable relative to scale 1 in measurement direction X. Scale 1 has a measuring graduation 11, which is scanned by scanning carriage 2. For this purpose, scanning carriage 2 includes an illumination unit that emits a light beam which is modulated by measuring graduation 11 as a function of position and finally impinges on light-sensitive scanning sensors of scanning carriage 2.

Scale 1 is disposed on a carrier 4. In the specific example illustrated in FIGS. 2 through 6, carrier 4 is a hollow section in which scale 1 and scanning carriage 2 are accommodated in a protected manner. Scale 1 is connected to carrier 4 in known manner, for example, by adhesive bonding or clamping. Carrier 4, which is configured as a hollow section, has a slot extending in measurement direction X. The slot is closed by sealing lips inclined in a roof-like manner, through which a drive dog 3 reaches with a sword-shaped middle piece. Drive dog 3 has a mounting region 31 by which it can be mounted to an object to be measured, such as a carriage of a machine tool.

For exact parallel guidance along scale 1, scanning carriage 2 is guided on scale 1 or, alternatively, on carrier 4. In the exemplary embodiment shown, scanning carriage 2 supports itself via guide elements 21 through 24 against two perpendicularly oriented guide surfaces 12, 13 of scale 1. One of these guide surfaces 12 is the surface that carries measuring graduation 11, and the other guide surface 13 is a narrow side of scale 1 extending perpendicularly thereto. Guide elements 21 through 24 may be slide elements, but in particular ball-bearing-mounted cylinders or rollers.

Scanning carriage 2 is coupled via a coupling to the drive dog 3 rigidly in measurement direction X and resiliently transversely thereto. The coupling includes a connecting element 5 which extends in measurement direction X and is rotatably mounted to scanning carriage 2 at a first play-free pivot joint 51 and to drive dog 3 at a second play-free pivot joint 52.

The connecting element is rigid against tensile and compressive stresses and preferably also flexurally stiff.

In the schematic representation of FIG. 1, the two pivot joints 51, 52 are shown only schematically.

In the specific exemplary embodiment shown FIGS. 2 through 6, first pivot joint 51 is configured as a ball-and-socket joint, including a ball 511 which, on the one hand, is rotatable in a receiving seat 512 of connecting element 5 and, on the other hand, is rotatably supported in a receiving seat 513 of scanning carriage 2. The ball 511 between connecting element 5 and scanning carriage 2 restrains scanning carriage 2 rigidly to connecting element 5 in measurement direction X, but compensates for rotational motion in all directions.

Second pivot joint 52 is also configured as a ball-and-socket joint, including a ball 521 which, in this case, is integrally formed on drive dog 3, as well as a corresponding receiving seat 522 on connecting element 5. The ball 521 between connecting element 5 and drive dog 3 restrains connecting element 5 rigidly to drive dog 3 in measurement direction X, but compensates for rotational motion in all directions.

Receiving seats 512, 513, 522 may be V-shaped, pan-shaped or configured as a half-shell. What is important is that a play-free pivot rest that is immovable in measurement direction X be formed with it.

The coupling for coupling scanning carriage 2 to drive dog 3 is also adapted to press scanning carriage 2 against at least one guide surface 12, 13. For this purpose, a first spring means 6 is provided between connecting element 5 and drive dog 3, the first spring means exerting a first pressure force $F_A$ on scanning carriage 2, pressing it against the at least one guide surface 12, 13. First spring means having the spring force $F_F$ acts on connecting element 5 and exerts the pressure force $F_A$ on scanning carriage 2 at the position of pivot joint 51. For the symmetrical arrangement shown, the following holds:

$$F_A = F_F * L/A$$

where $F_F$ spring force of each of the spring elements 6 and 7

L distance between the two spring elements 6 and 7

A distance between the two pivot joints 51 and 52

Furthermore, a second spring means 7 is provided between connecting element 5 and scanning carriage 2, the second spring means exerting a second pressure force $F_F$ on scanning carriage 2, pressing it against the at least one guide surface 12, 13 as well. First spring means 6 is spaced apart from second spring means 7 in measurement direction X. In FIG. 1, this distance is denoted by L.

If first pivot joint 51 is configured as a ball-and-socket joint, including ball 511, receiving seat 512 and receiving seat 513, then spring means 6 holds the parts forming pivot joint 51 together in that ball 511 restrains scanning carriage 2 to connecting element 5 without play in measurement direction X.

If second pivot joint 52 is also configured as a ball-and-socket joint, including ball 521 and the corresponding receiving seat 522, then second spring means 7 holds ball 521, thus restraining connecting element 5 to drive dog 3 without play in measurement direction X.

In the specific exemplary embodiment, first spring means 6 and second spring means 7 are each a compression spring, in particular a coil spring.

Figure 4:
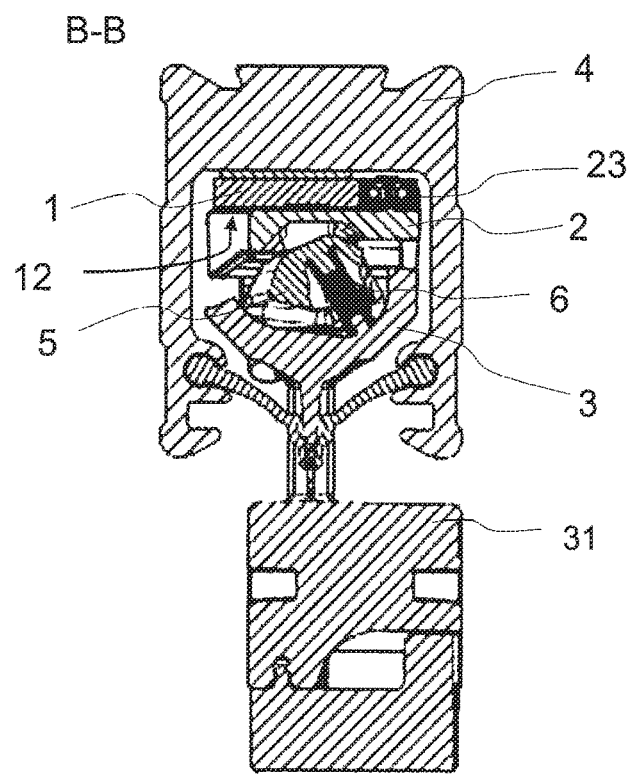
FIG. 4 is a cross-sectional view of the length-measuring device, taken along line B-B in FIG. 2.
Figure 5:
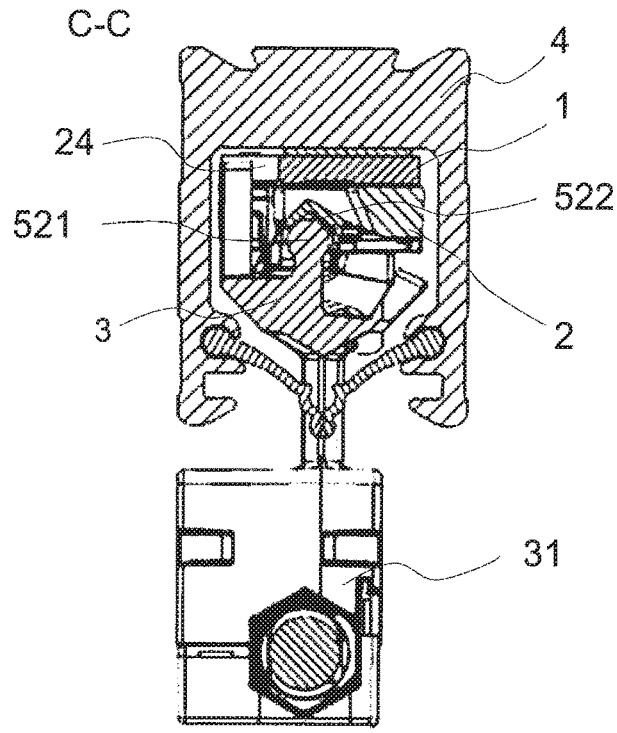
FIG. 5 is a cross-sectional view of the length-measuring device, taken along line C-C in FIG. 2.
Figure 6:
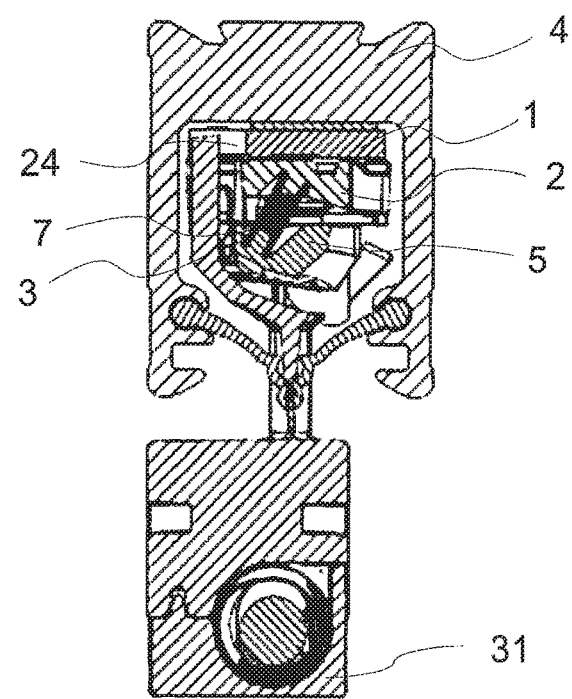
FIG. 6 is a cross-sectional view of the length-measuring device, taken along line D-D in FIG. 2.

In the specific exemplary embodiment, first spring means 6 and second spring means 7 are disposed such that each of spring means 6, 7 urges scanning carriage 2 with one force component against the one guide surface 12 and with another force component against the other guide surface 13. If both spring means 6, 7 are compression springs, they are disposed inclined relative to the two guide surfaces 12, 13, as illustrated in FIGS. 4 and 6.

It is particularly advantageous if the first spring means 6 and the second spring means 7 are disposed and configured such that the resulting pressure force on scanning carriage 2 acts at the center of gravity S of scanning carriage 2. By this measure, scanning carriage 2 is optimally balanced.

Provided that spring means 6 and 7 have identical spring characteristics, first spring means 6 and second spring means 7 are disposed at equal distances L/2 from the center of gravity (center of mass) S of scanning carriage 2, viewed in measurement direction X.

For optimized force transmission, spring means 6 and 7 are each disposed at, or at least near, the position of the respective pivot joint 51, 52 (viewed in the measurement direction). Distance L may be equal to distance A. For reasons of space limitations, A may also be selected to be unequal to L, as in the example shown. The normal forces $F_A$ in pivot joints 51, 52, and thus the friction torques in pivot joints 51, 52, are reduced when L is selected to be smaller than A.

For a symmetrical arrangement, the following holds for the contact force $F_A$ in pivot joints 51, 52:

$$F_A = F_F * L/A$$

The resulting pressure force on scanning carriage 2 is $$F_A + F_F$$

It is advantageous if first pivot joint 51 and second pivot joint 52 are disposed at equal distances A/2 from the center of gravity (center of mass) S of scanning carriage 2, viewed in measurement direction X.

If center of gravity (center of mass) S of scanning carriage 2 is not located centrally, then the resulting pressure force should be shifted from the center to the real center of gravity S using different spring means and/or different distances between the spring means and the pivot joints.

The measuring graduation may be an incremental measuring graduation or an absolute code.

The present invention is not limited to the optical scanning principle. The scanning of the scale may also be performed capacitively, magnetically or inductively, to which end the measuring graduation and the scanning sensors have to be designed accordingly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A length-measuring device, comprising:
   a carrier extending longitudinally in a measurement direction, a scale having a measuring graduation being disposed on the carrier;
   a scanning carriage configured to scan the measuring graduation, the scanning carriage being guided longitudinally in the measurement direction on at least one guide surface;
   a coupling which couples the scanning carriage to a drive dog rigidly in the measurement direction and resiliently transversely to the measurement direction, the coupling including a connecting element which extends in the measurement direction and is rotatably mounted to the scanning carriage at a first pivot joint and to the drive dog at a second pivot joint spaced apart from the first pivot joint in the measurement direction;
   a first spring disposed between the connecting element and the drive dog, the first spring exerting a pressure force on the scanning carriage at a first position so as to press the scanning carriage against the at least one guide surface; and
   a second spring disposed between the connecting element and the scanning carriage, the second spring being spaced apart from the first spring in the measurement direction and exerting a pressure force on the scanning carriage at a second position spaced apart from the first position in the measurement direction so as to press the scanning carriage against the at least one guide surface.

2. The length-measuring device as recited in claim 1, wherein the scanning carriage is guided longitudinally in the measurement direction on two guide surfaces extending perpendicular to each other.

3. The length-measuring device as recited in claim 2, wherein the scanning carriage is guided longitudinally in the measurement direction on two guide surfaces of the scale extending perpendicular to each other.

4. The length-measuring device as recited in claim 1, wherein the first pivot joint and the second pivot joint are each configured as a ball-and-socket joint.

5. The length-measuring device as recited in claim 1, wherein the first spring and second spring are each a compression spring.

6. The length-measuring device as recited in claim 1, wherein the first spring and the second spring are disposed and configured such that a resulting pressure force on the scanning carriage acts at the center of gravity of the scanning carriage.

7. The length-measuring device as recited in claim 6, wherein the first spring and second spring are each a compression spring.

8. The length-measuring device as recited in claim 1, wherein the first spring and the second spring are disposed at equal distances from the center of gravity of the scanning carriage as viewed in the measurement direction.

9. The length-measuring device as recited in claim 8, wherein the first spring and second spring are each a compression spring.

10. The length-measuring device as recited in claim 1, wherein the first pivot joint and the second pivot joint are disposed at equal distances from the center of gravity of the scanning carriage as viewed in the measurement direction.

11. The length-measuring device as recited in claim 10, wherein the first pivot joint and the second pivot joint are each configured as a ball-and-socket joint.

\* \* \* \* \*